Figure 1:
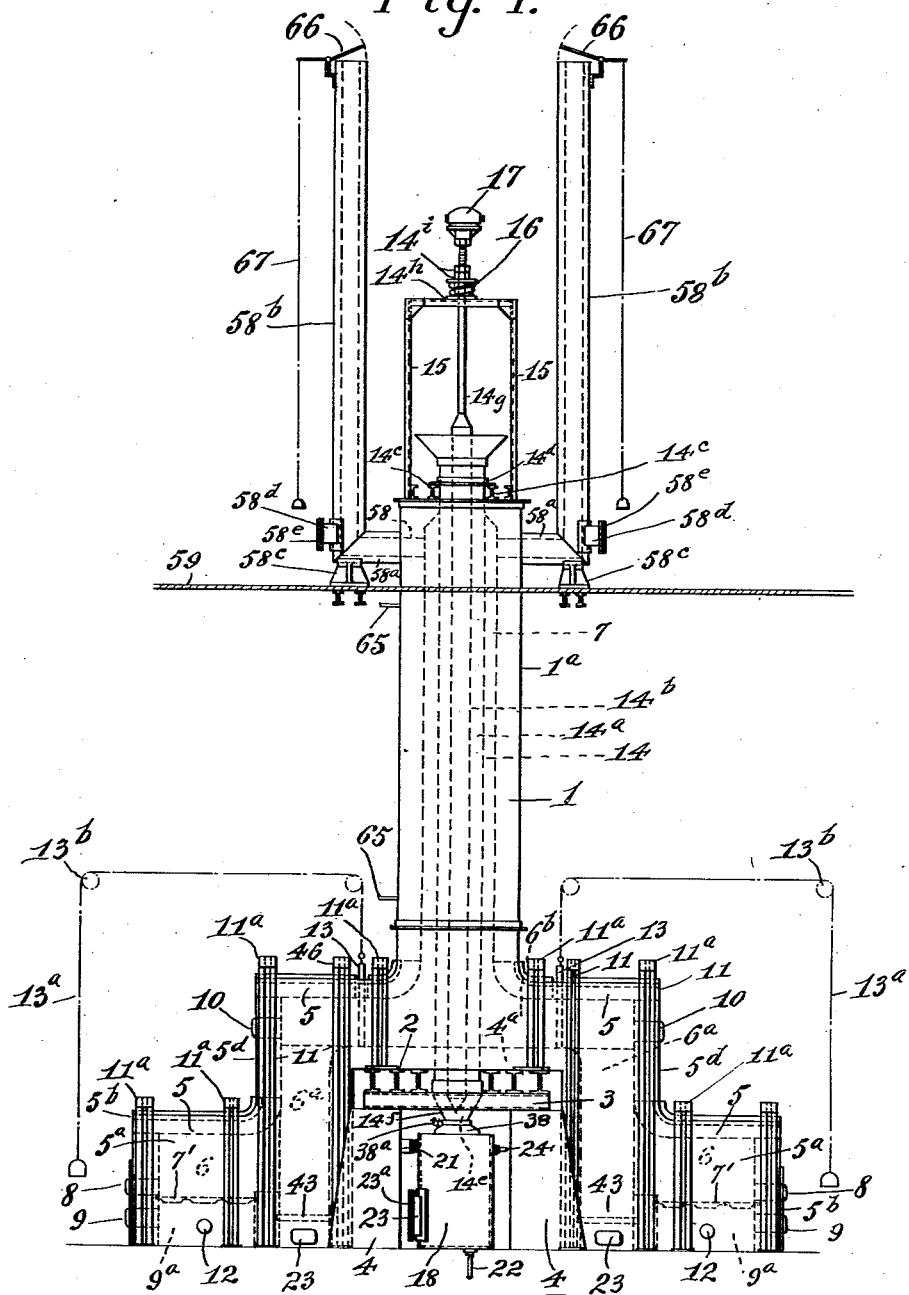

Aug. 18, 1925.

1,550,271

W. R. MACKLIND ET AL

ART OF MAKING LITHOPONE

Filed July 30, 1923     6 Sheets-Sheet 1

Inventors-
W^m R. Macklind, E. C. Holton,
H. J. Hain.    G. C. M^c Carten.
W. Sydney Stevens
By
Attorney Aug. 18, 1925.                                                    1,550,271
W. R. MACKLIND ET AL
ART OF MAKING LITHOPONE
Filed July 30, 1923        6 Sheets-Sheet 2
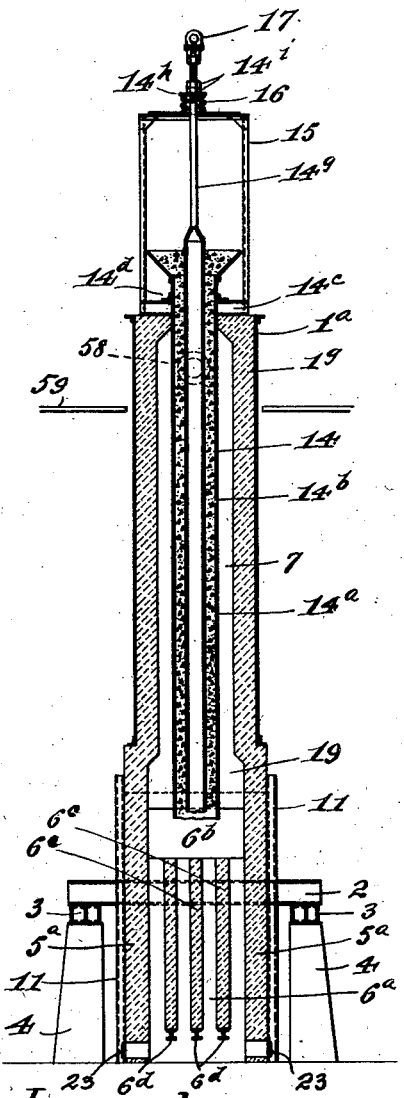
Inventors-
W<sup>m</sup>. R. Macklind, E. C. Holton,
H. J. Hain,           G. C. M<sup>c</sup>Carten
W. Sydney Stevens
By. _____
           Attorney Inventors-
W. R. Macklind, E. C. Holton,
H. J. Hain, G. C. McCarten.
W. Sydney Stevens
By Attorney

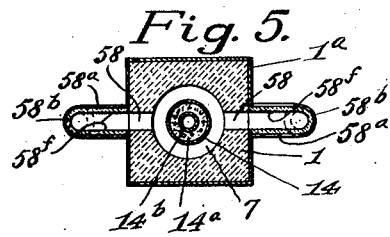
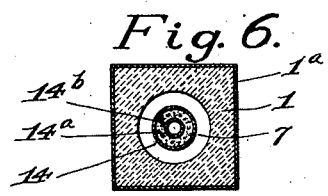
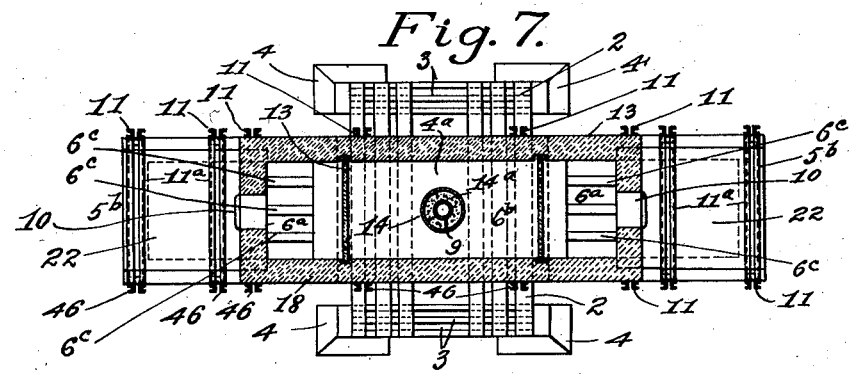
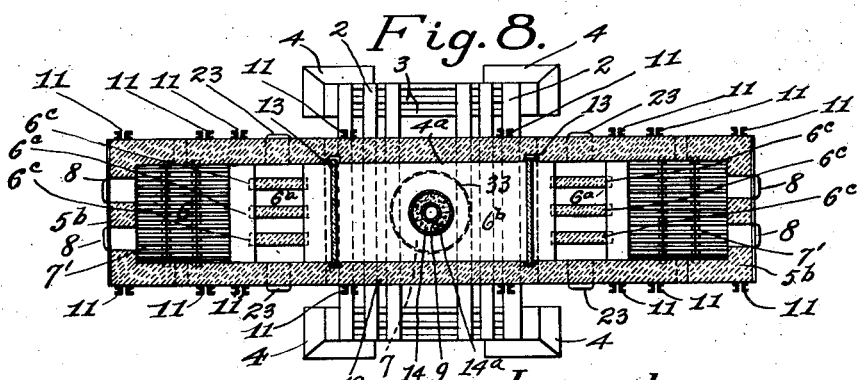

Aug. 18, 1925.
W. R. MACKLIND ET AL
1,550,271
ART OF MAKING LITHOPONE
Filed July 30, 1923    6 Sheets-Sheet 5
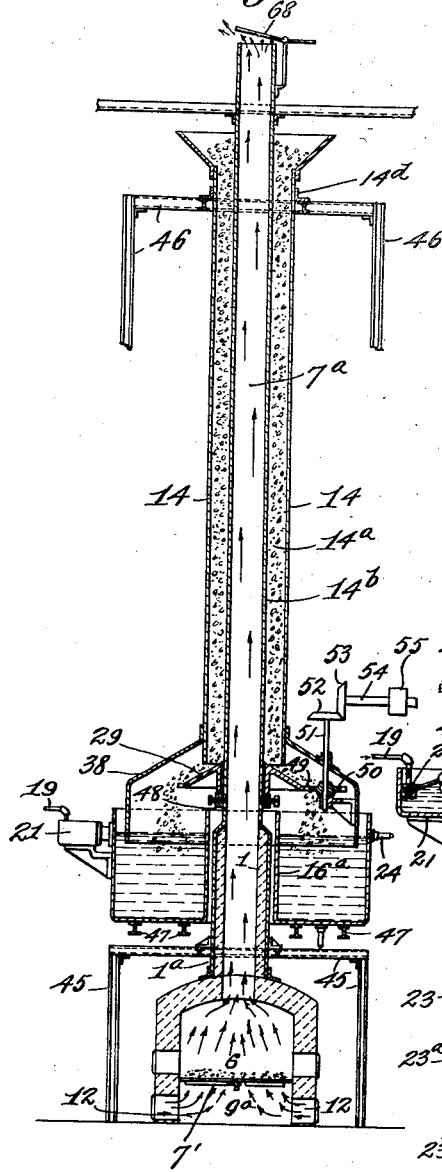
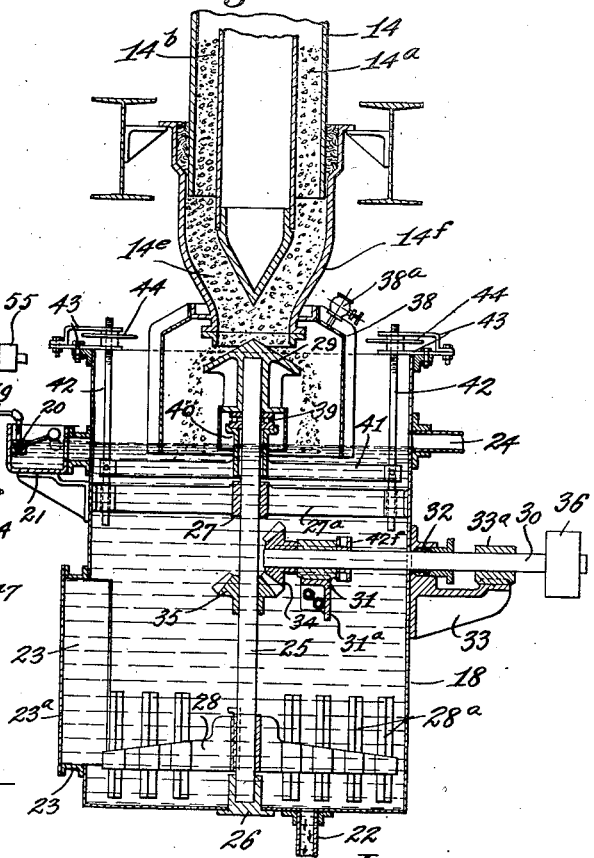
Inventors
WM. R. Macklind, E. C. Holton,
H. J. Hain.    G. C. McCarten.
W. Sydney Stevens
By Chas. E. Gillman
Attorney Aug. 18, 1925. 1,550,271
W. R. MACKLIND ET AL
ART OF MAKING LITHOPONE
Filed July 30, 1923 6 Sheets-Sheet 6
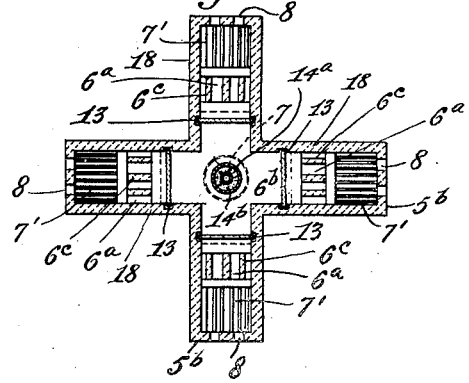
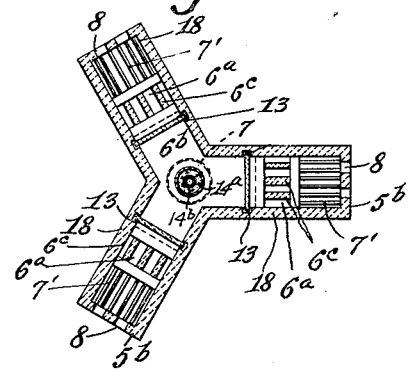
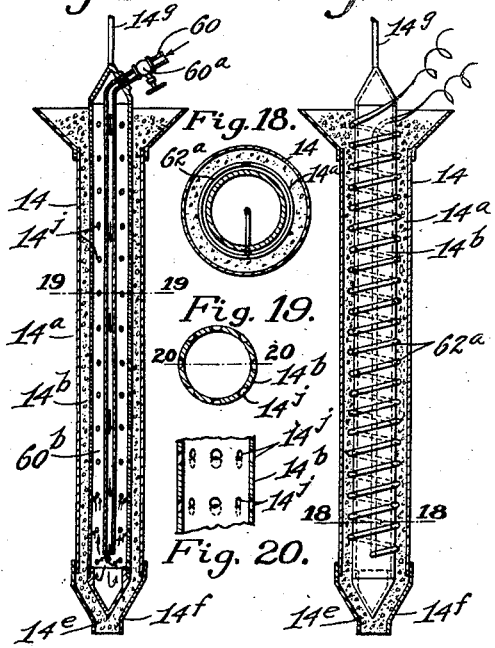
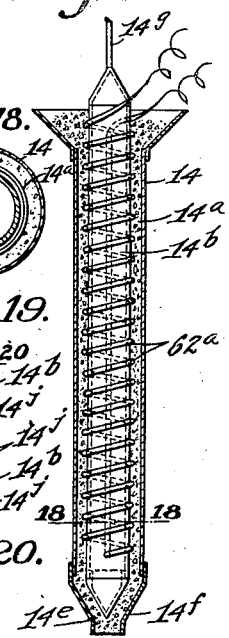
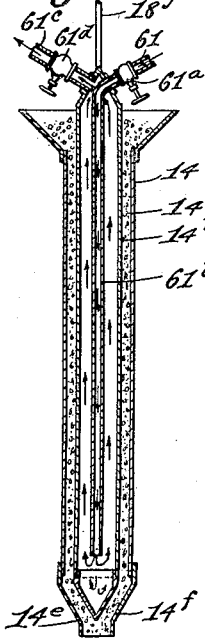
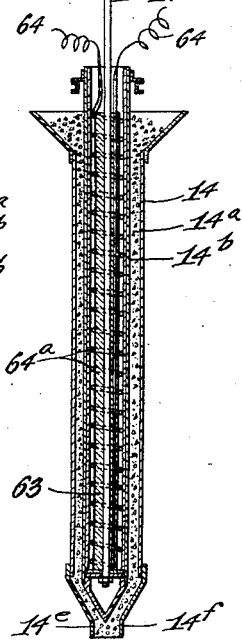
Inventors-
W<sup>m.</sup>R. Macklind, E.C. Holton,
H.J. Hain, G.C. M<sup>c</sup>Carten.
W. Sydney Stevens
By _____
Attorney Patented Aug. 18, 1925.

1,550,271

UNITED STATES PATENT OFFICE.

WILLIAM R. MACKLIND, GEORGE C. McCARTEN, AND WILLIAM SYDNEY STEVENS, OF CHICAGO, ILLINOIS, AND EDWARD C. HOLTON AND HENRY J. HAIN, OF CLEVELAND, OHIO, ASSIGNORS TO THE SHERWIN-WILLIAMS COMPANY, OF CLEVELAND, OHIO, A CORPORATION OF OHIO.

ART OF MAKING LITHOPONE.

Application filed July 30, 1923. Serial No. 654,602.

*To all whom it may concern:*

Be it known that we, WILLIAM R. MACKLIND and GEORGE C. McCARTEN, citizens of the United States, and WILLIAM SYDNEY STEVENS, a subject of Great Britain and Ireland, and all residing at Chicago, in the county of Cook and State of Illinois, and we, EDWARD C. HOLTON and HENRY J. HAIN, citizens of the United States, residing at Cleveland, in the county of Cuyahoga and State of Ohio, have invented certain new and useful Improvements in the Art of Making Lithopone, of which the following is a specification.

This invention relates to the art of making lithopone, and more particularly to an improved process of treating or muffling lithopone, together with suitable apparatus for carrying the process into effect.

More specifically speaking the invention relates to improvements in muffle furnaces, the present embodiment being particularly designed and adapted for use in the muffling of lithopone and similar or analogous material.

The primary object is the provision of an improved process of treating or muffling lithopone through the medium of improved apparatus for carrying out the process, and particularly to improve the quality of the final or finished product as the result of such process.

While the present embodiments of the muffle furnace are particularly designed and adapted for muffling lithopone and the like, it should of course be understood that the same may be readily modified as to details to meet the varying requirements in the treatment of widely varying substances and to meet the exigencies of actual service.

The invention further relates to an improved retort for muffle furnaces, such retort being designed to feed and muffle the lithopone in a continuous and highly efficient manner resulting in a uniform and superior product. By means of our improved process and the improved means for carrying same into effect the lithopone may be subjected to any desired heat or calcining treatment, and to vary the lengths of time such lithopone is subjected to the muffling operation.

A still further object is the provision of means whereby the lithopone or other material being treated may be subjected to the action of any specific treating fluid or gas while being passed through the muffling or calcining retort, and whereby also material of widely varying fineness or consistency may be treated.

A further object is the provision of improved temperature control means whereby the temperature of the furnace generated treating fluids or gases may be increased or decreased at the will of the operator and whereby the temperatures will be indicated at all times to the operator.

A further object is the provision of an improved retort for furnaces of this class which may be readily installed and used in connection with furnaces having varying forms and arrangements of fire boxes and combustion chambers.

There are other features of the invention residing in elemental combinations and particular construction of parts, all as will hereinafter more fully appear.

With the above mentioned and other ends in view, the invention consists in the improved process hereinafter referred to, together with improved apparatus for carrying out the same, such apparatus being illustrated in some of its embodiments in the accompanying drawings and as hereinafter referred to, and being particularly pointed out in the appended claims.

Referring to the accompanying drawings, forming a part of this specification, Figure 1 is a side elevation of a muffle furnace, constructed in accordance with this invention and of a convenient form for carrying our improved process into effect.

Fig. 2, an end elevation of the same.

Figure 4:
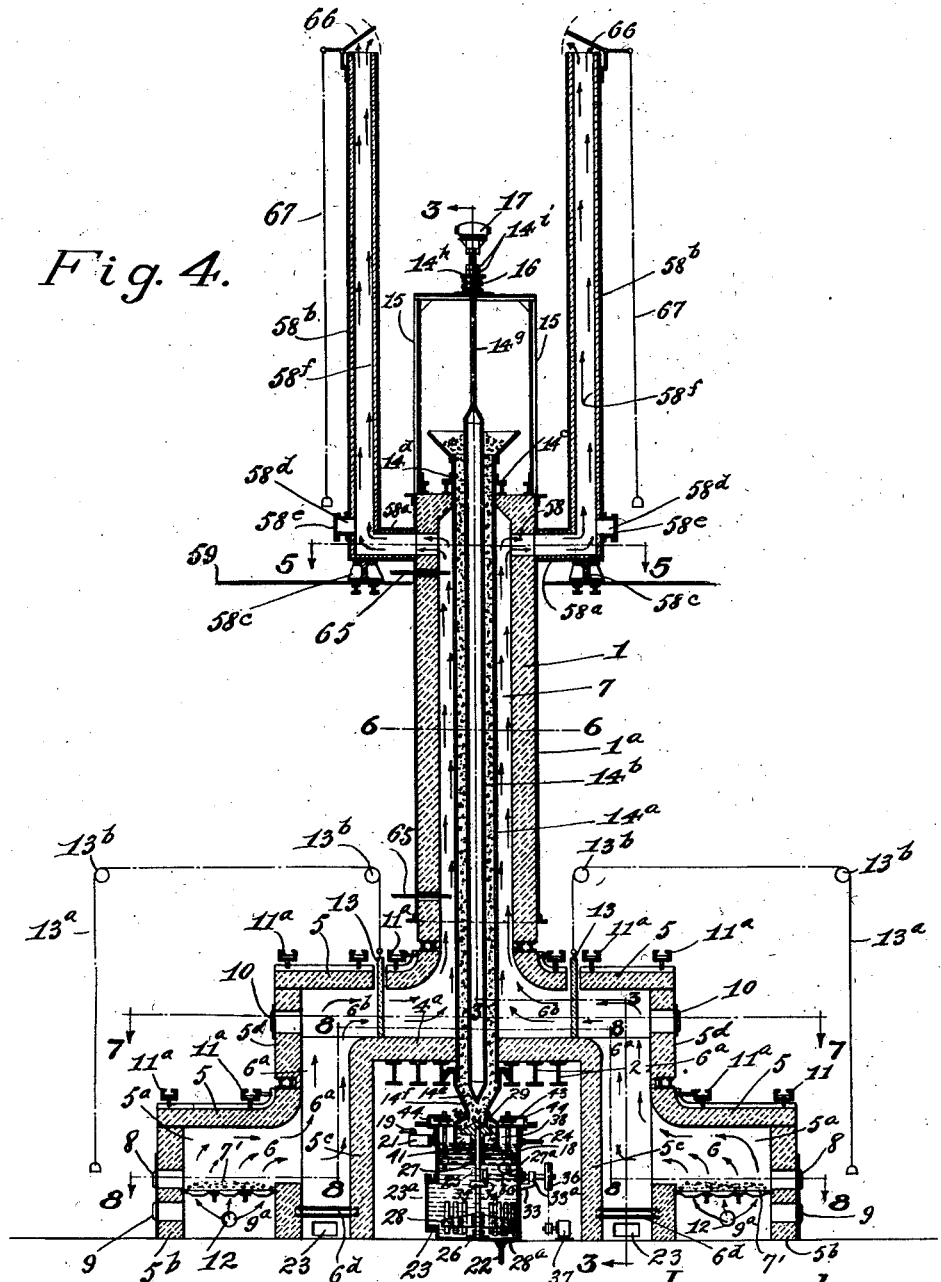

Fig. 3, a central vertical sectional view of the same taken on line 3—3 of Figure 4.

Fig. 4, a central vertical longitudinal sectional view taken on line 4—4 of Fig. 2.

Fig. 5, a horizontal cross sectional view taken on line 5—5 of Fig. 4.

Fig. 6, a similar view taken on line 6—6 of Fig. 4.

Fig. 7, a horizontal longitudinal sectional view taken on line 7—7 of Fig. 4.

Fig. 8, a similar view taken on line 8—8 of Fig. 4.

Fig. 9, an enlarged central vertical sectional view of the quenching tank or unit shown in the lower central portion of Fig. 4.

Fig. 10, a central vertical sectional view of a modified form of the muffle furnace for carrying out our improved process.

Fig. 11, a central vertical sectional view of a modified form of quenching tank or unit, together with means for mounting and centralizing the lower end of the core at the discharge end of the retort.

Fig. 12, a horizontal sectional view of a modified form of furnace in which four fire boxes are provided instead of two as shown in Figs. 1 to 8, inclusive, of the drawings.

Fig. 13, a similar view showing a three fire box arrangement.

Fig. 14, a central vertical sectional view of a modified form of retort embodying a modified form of core whereby treating a fluid such as a suitable gas may be introduced and whereby a circulation is permitted between the core and the annular material feeding and treating chamber or passage through the medium of suitable openings or passages therebetween.

Fig. 15, a further modified form embodying a core surrounded by a coil or helix of suitable resistance wire whereby the core and the material adjacent thereto may be heated electrically.

Fig. 16, a similar view of a further modification embodying a form of core in which treating fluids or gases under pressure and of any desired temperature may be introduced and circulated.

Fig. 17, a similar view of a further modification embodying a further modified form of core and in which the heating element is arranged within the core to transmit heat through the walls of the latter and into the surrounding material to be treated.

Fig. 18, a cross sectional view taken on line 18—18 of Fig. 15.

Fig. 19, a cross sectional view taken on line 19—19 of Fig. 14.

Fig. 20, an enlarged fragmentary sectional view showing a modified arrangement of the ports in the walls of the core shown in Fig. 14 for the purpose of directing the treating fluids or gases downwardly.

Similar numerals of reference designate like parts throughout all the figures of the drawings.

For the purpose of illustration we have herein disclosed our improved process in connection with suitable apparatus for carrying it into effect, said apparatus being particularly designed and adapted for use in the muffling of lithopone, the particular embodiments of the improved apparatus being in the specific form of furnaces of the type or class generally known as "muffle furnaces." While our improved retort or muffle may be used in connection with or incorporated in furnaces of varying specific forms and may be readily adapted for use in the treatment of various materials, we prefer to use the same in connection with certain cooperating features of construction in a muffle furnace, hereinafter referred to, when muffling or treating lithopone or analogous material.

As applied to the muffling of lithopone the hot treating gases or products of combustion are preferably supplied from a plurality of fire boxes and combustion chambers communicating with a common manifold or equalizing chamber leading to a common centrally arranged furnace structure or column provided with a common central flue or chamber for the hot treating gases and within which is located the improved retort or muffle having an annular material receiving and feeding chamber, hereinafter referred to.

In Figs. 1 to 8, inclusive, we have shown a furnace structure embodying two oppositely disposed fire boxes and combustion chambers communicating with a common equalizing chamber or manifold, while in Figs. 12 and 13 we have shown modified arrangements of such fire boxes and combustion chambers adapted to be used in connection with a furnace structure embodying our improved tubular retort or muffle mounted and operated as hereinafter more fully referred to.

The main furnace structure or column 1, comprises suitable fire bricks or other appropriate heat refractory material and, in the present instance, surrounded by a metallic shell $1^a$. The furnace structure 1 may be mounted and supported in any suitable and convenient manner, as for example,—by means of a plurality of beams 2, the latter being supported at their ends on lintels 3, carried upon the foundation pillars or columns 4.

The fire box, combustion chamber and ash pit portions of the furnace are arranged about the base portions thereof, said portions or units being preferably formed by means of the suspended arch walls 5, the side walls $5^a$, the front or face walls $5^b$ and the back or furnace walls $5^c$. The upper arch members 5 and the intermediate or front walls $5^d$, conjointly with the base or foundation wall $4^a$ of the furnace structure, proper, and the back walls $5^e$ form vertical heat accumulating chambers or passages $6^a$, leading from the fire boxes or combustion chambers 6, with a common heat equalizing chamber or manifold $6^d$, the latter leading to and supplying the main flue or heat chamber 7, of the furnace structure or column 1.

The heat accumulating chambers or passages $6^a$ are preferably provided with vertical partition members $6^c$, the latter, in the present instance, being supported on suitable cross beams 6ᵈ, in the walls of the furnace and fire box structures. Suitable grate structures 7', are provided, the front or face walls 5ᵇ being provided with suitable fire doors 8, and ash pit doors 9, leading to the combustion chambers 6 and ash pits 9ᵃ, respectively. Suitable clean-out doors 10, are provided in the side walls 5ᵃ and leading to the vertical heat accumulating chambers or passages 6ᵃ of the fire boxes and combustion chambers.

The side walls 5ᵃ of the fire boxes are provided with vertical buckstays carrying the cross supports 11ᵃ, the latter carrying or suspending the upper and lower arch members 5.

The ash pits 9ᵃ are provided with blast inlets 12 for the supply of air thereto in the usual and well known manner and whereby the combustion and supply of the products of combustion may be regulated in the relation thereof to the furnace chamber or flue provided with the muffle or retort hereinafter referred to.

As a means of further regulating the admission of hot treating gases to the furnace chamber, proper, and particularly as a means of individually and independently regulating the amount of gases passing from each combustion chamber and into and through the equalizing chamber or manifold 6ᵇ, each arm or flue of the latter is provided with a vertically movable damper 13, operating in vertical slots in the upper arch members 5 and controlled by means of the control cables 13ᵃ, passing over pulleys 13ᵇ, and leading to convenient reach of an attendant.

The vertically disposed partition members 6ᶜ provide a plurality of vertical passages or flues of relatively large area, said partition members being formed of suitable heat absorbent material and hence possess considerable heat storage capacity. In view of the construction and arrangement of the parts, slight variations in temperature of the products of combustion are effectively neutralized in the heat accumulating chambers 6ᵃ and the heating gases from the equalizing chamber or manifold 6ᵇ are delivered into the furnace chamber or flue 7 of substantially uniform temperature.

Referring now to the improved retort and the manner in which the same is mounted and disposed within the heating chamber of the furnace and to which this invention particularly relates, it will be seen that we provide a vertically disposed retort centrally arranged in and spaced from the walls of the furnace structure or column 1, forming an annular or surrounding heating chamber 7 for the products of combustion or hot gases in the active muffling zone of the retort, said retort comprising an outer wall 14, of relatively great heat conductivity such as iron, or the like, and being preferably of tubular formation, as shown. As a means of providing an annular material carrying and feeding chamber 14ᵃ between the outer walls of the retort, as well as assisting gravity in the feeding of the lithopone or material within the annular chamber 14ᵃ by vibrating or agitating the material through the medium of suitable vibrating or agitating mechanism, we provide a central core or vibratory element 14ᵇ extending throughout the length of the tubular retort. The retort wall 14 and core or vibratory element 14ᵇ are preferably suspended within the furnace column 1 and supported upon the top of the latter in some suitable manner, as for example,—by means of supporting rails or beams 14ᶜ disposed upon the top of the furnace column 1, said supports 14ᶜ, in the present instance, engaging beneath an attaching ring 14ᵈ, surrounding and attached to the upper outer portion or the tubular wall 14 of the retort. The annular material carrying and feeding chamber 14ᵃ is open at its top to receive the material or lithopone through the medium of a suitable hopper and also to permit of the escape of the gases from the lithopone as being muffled within the retort.

The lower portion of the annular chamber 14ᵃ is preferably constricted converging into a common discharge opening 14ᵉ, said discharge opening 14ᵉ being formed, in the present instance, by means of a conical shaped head 14ᶠ which latter, may be independently mounted and may, if desired, be connected to beams 2 supporting the furnace structure, as shown most clearly in Figs. 4 and 9 of the drawings, or if desired, such conical heads 14ᶠ may be connected directly to the lower end of the outer tubular wall 14 of the retort, as shown in Figs. 14 to 17, inclusive, of the drawings.

The central core or vibratory element 14ᵇ is preferably suspended from above and at a common point with the lower end free or unattached, as shown in Figs. 1 to 9, inclusive, of the drawings and in Figs. 14 to 17, inclusive, of the drawings, but if desired, the lower end may be guided as against lateral movement, as shown in Fig. 11 of the drawings, as hereinafter referred to.

The vibratory element 14ᵇ is preferably of tubular formation throughout and may be suspended by means of a suspensory element or rod 14ᵍ, extending upwardly and supported on a common support or frame 15 carried, in the present instance, upon the top of the furnace column 1, said suspensory element 14ᵇ being preferably provided with a collar 14ʰ, removably and adjustably mounted by means of nuts 14ⁱ, and carried on a resilient element or spring 16, carried by the supporting or suspending frame 15. The suspensory element 14g may be connected to a suitable vibrator indicated generally by the numeral 17.

The lithopone or other material being treated passes down through the annular chamber 14a by means of gravity and the vibration given to the core or vibratory element 14b, the cushioning spring 16 and the vibrator 17 permitting of longitudinal vibratory as well as lateral movement to be imparted to the core or vibratory element 14b. These vibrations imparted to the vibratory central or core element 14b and the relative movements between the latter and the outer wall 14 of the retort, and assisted by gravity, will cause the material to be moved downwardly through the annular passage or chamber 14a as being calcined or muffled toward the discharge end of the retort and into the quenching tank, hereinafter referred to. These vibrations may be obtained mechanically through a mechanical vibrator as described, or electrically as suggested in Figs. 15 and 17 of the drawings, or in some other suitable and convenient manner. The number of vibrations per minute will depend upon the working conditions and the results desired and may vary widely, as for example,—from nothing to ten thousand or fifteen thousand vibrations per minute.

The quenching tub or tank 18, is located beneath the discharge end of the retort, the quenching liquid or water being supplied through the medium of a suitable inlet pipe 19, controlled by means of a suitable ball cock 20, operated in a suitable float box or tank 21, and by means of which the quenching liquid may be maintained at a predetermined height. The contents of the quenching tank 18 may be discharged through the discharge opening in the bottom provided with the discharge pipe 22, as shown most clearly in Figs. 1 and 9 of the drawings. The quenching tank 18 may be provided with a manhole 23, at one side and a manhole cover 23a, for the purpose of inspection and the making of repairs to the mechanism within the tank. The quenching tank 18 is also preferably provided at one side with an overflow connection or pipe 24 for the discharge of the quenching liquid when it gets above the proper working height.

As a means of constantly stirring or agitating the material discharged within the quenching tank 18, as well as feeding the material from the discharge end of the retort and also providing means for regulating the feeding of such material into such quenching tank (see Fig. 9), a central vertical driving shaft 25, is provided, said shaft being mounted, in the present instance, in a central bearing 26 in the bottom of the tank and in a bearing 27 of a cross arm 27a in the upper portion of the tank. The shaft 25 is provided with an agitator arm 28, carrying a series of agitator teeth 28a to constantly stir the material and keep the same from settling within the quenching tank.

The upper end of the driving shaft 25 is provided with a vertically movable feeder cone 29, adapted to be driven by said shaft 25 and suitably keyed or splined thereon so that the same may be moved toward and from the discharge head 14f to regulate the discharge space over the feeder cone 29 and from the discharge opening 14e.

The shaft 25 may be driven by a second shaft 30, mounted in a bearing 31, on a tank bearing bracket 31a, said shaft 30 extending through a stuffing box 32, in the side of the tank and being mounted also in a bearing 33a, in a bearing bracket 33, on the exterior of the tank. The driving shaft 30 is provided near its inner end with a bevel gear 34, meshing with a second bevel gear 35, on the vertical driving shaft 25, the outer end of the shaft 30 being provided with a pulley 36, adapted to receive a suitable belting to communicate with a motor 37, as shown in Fig. 4 of the drawings, or some other suitable and convenient source of power.

The discharge portion of the retort is preferably provided with an overhanging shield or bell 38, having its lower or open edges adapted to extend into the quenching liquid and form a vacuum lock or pocket to exclude air from the material as discharged from the retort into the quenching liquid. If under certain conditions it is desired to introduce a small quantity of air or other fluid into the chamber formed by the bell 38 or to vary somewhat the pressure, the bell 38 may be provided with a valve 38a which may be opened and closed as desired for the purposes indicated.

As a means of regulating the feed through the feed cone 29, the latter may be mounted on ball bearings 39, resting on a bearing sleeve 40, carried by a cross bar 41, the latter being carried on adjusting rods 42. The rods 42 extend upwardly through suitable guides 43, along the upper edges of the tank 18 and are threaded and provided with adjusting wheels 44.

In the modified form shown in Fig. 10 of the drawings the column 1 is supported on the supporting structure 45, and the inner core or element is of enlarged tubular formation forming a continuation of the furnace structure at the base and providing the main flue or heating chamber 7a, so that the material within the annular chamber 14a is heated from within the core instead of exteriorly as in the other figures of the drawings. In this instance also the retort feeding hopper is independently supported on the supporting structure 46, instead of directly upon the furnace stack 1, as shown in the other figures of the drawings. In this instance also the quenching tank 18 is elevated and supported on the beams 47 and is of annular form by being provided with the central tube 18$^a$, to receive the furnace column and the tubular member 14$^b$ forming the main heating chamber 7$^a$. As a means of driving the feeder cone 29, the latter is rotatably mounted about the enlarged tubular element 14$^b$ on the bearing ring 48, said feed cone being provided on its outer periphery with a gear 49, meshing with a pinion 50, arranged on a driving shaft 51, the latter being suitably mounted and provided with a bevel gear 52, the latter meshing with a second bevel gear 53, on a second driving shaft 54, said shaft 54 being provided with a pulley 55, adapted to receive a belting communicating with a suitable source of power.

In Fig. 11 of the drawings the lower end of the core or vibratory element 14$^b$ is centralized as against lateral movement by being provided with a bearing head 56, the latter having an opening 56$^a$, to receive a bearing or centralizing shaft 57, extending upwardly from the feed cone 29.

In the form shown in Figs. 1 to 9, inclusive, of the drawings the furnace stack or column 1 is provided near its top with oppositely disposed flue openings 58, connected to horizontally disposed flue members 58$^a$, the latter being connected to oppositely arranged or vertically disposed stacks 58$^b$, for the escape of the hot gases or products of combustion from the main flue or heating chamber 7. The flues or stacks 58$^b$ may be supported on suitable supports 58$^c$ extending, in the present instance, along the feeding floor 59. The base portions of the stacks are provided with clean-out openings 58$^d$, covered by suitable covers 58$^e$.

In the modified form of retort shown in Fig. 14 of the drawings we have shown a modified form of core of hollow formation wherein it is possible to introduce a suitable treating fluid, such for example,—as various active, reactive and inert gases, such introduction, in the present instance, being accomplished by means of an inlet pipe or conduit 60, provided with a suitable valve 60$^a$, the pipe 60 terminating in a vertically extending centrally located feed portion 60$^b$, opening at the lower end and being adapted to discharge the treating fluid at such lower end and to fill the space or chamber within the core element 14$^b$. In this instance as a means of permitting the fluid or gas to pass out of the core chamber into the annular material carrying and feeding chamber 14$^a$, the walls of the hollow or core element are provided with a series of outlet openings or ports 14$^j$, the latter being preferably inclined downwardly and outwardly, as shown most clearly in Fig. 20 of the drawings. Through the medium of the features referred to it is possible through the use of appropriate treating fluid to bring about such changes in the material being treated as may be desired, thereby providing, for example, for the treatment of material at varying temperatures in the presence of specific treating fluids or gases.

In Fig. 16 of the drawings we have provided means for introducing heating or cooling fluids or liquids through the medium of an inlet pipe or conduit 61, provided with a valve 61$^a$, such inlet conduit having a centrally located vertically extending portion 61$^b$, adapted to discharge the fluid or liquid in the lower end of the chamber of the core element and after circulating in such core chamber to pass out of the same at the top through the medium of an outlet pipe or conduit 61$^c$, provided with a suitable control valve 61$^d$.

In Figs. 15 and 17 of the drawings we have shown means for heating the core element electrically, the core in Fig. 15 being covered by a surrounding coil or helix 62$^a$, connected to the conductor wires 62, while in the form shown in Fig. 17 of the drawings a separate core 63 is introduced within the tubular element 14$^b$, this inner core 63 being provided with a coil or helix 64$^a$, connected to the conductors 64. In this latter instance the heating or resistance unit 64$^a$ rests against the inner walls of the tubular core to heat the latter from within and transmit heat through the walls thereof to the material in the chamber 14$^a$, while in the form shown in Fig. 15 the heating element 62$^a$ is on the outside of the tubular core element and comes into direct contact with the material in the chamber 44$^a$.

It will be seen that by reason of the construction and arrangement of the parts which go to make up the improved retort the size and capacity of the annular material carrying and feeding chamber 14$^a$ may be readily altered, as desired. For example,—by increasing the diameter of the core or vibratory element 14$^b$ the annular space or chamber 14$^a$ will be correspondingly decreased or narowed, thereby increasing the speed of travel of the material passing therethrough. The size of the annular passage or chamber 14$^a$ will be varied in accordance with the character of the material being treated, the quality of the product desired, and the relative temperature of the treating gases passed into the chamber 14$^a$ from the combustion chamber. As a means of indicating at all times the temperature of the treating gases in the annular heating chamber 7 surrounding the retort, the furnace structure is provided with openings in the upper and lower portions thereof adapted to receive and carry suitable pyrometers 65, as shown most clearly in Figs. 1 and 4 of the drawings.

The flow and temperature of the hot treating gases through the furnace heating chamber 7 and about the improved retort may be readily regulated through the blast and damper control mechanism, together with the means for controlling the exit of the exhaust heating gases through the stacks 58ᵇ. In the forms shown in Figs. 1 to 4, inclusive, of the drawings, the draught through the stacks may be independently controlled through the pivoted stack dampers 66, operated through the control cables 67. Upon reference to Figs. 4 and 5 of the drawings it will be seen that the base portions 58ᵃ of the stacks together with the vertically extending stacks 58ᵇ are lined with suitable fire brick or other refractory material 58ᶠ. In the form shown in Fig. 10 of the drawings the core tube which also forms the heating flue or chamber of the furnace is provided with a similar damper 68, adapted to be operated by means of similar control mechanism.

It will be seen that our improved vertically disposed retort embodying a central core or vibratory element and forming an annular material carrying and feeding chamber possesses many advantages. The annular form of the material carrying and feeding chamber and the central core or vibratory element provide for a new method of treating and feeding the lithopone. In the upper part of the retort the incoming lithopone is subjected to the hot gases escaping from the active muffling zone of the retort. These hot gases serve to dry and pre-heat the lithopone, and more particularly serve to drive off from the incoming lithopone any occluded or entrained air and consequently as the lithopone reaches the active muffling zone practically all of the entrained air in the original raw lithopone has been driven off. Furthermore, the drying and pre-heating treatment is carried out at the expense of the hot gases driven from the lithopone during the active muffling treatment, thereby effecting a marked economy in the heat required for drying the crude lithopone as well as in the heat necessary for the active muffling treatment. During the muffling operation, the lithopone is maintained in the active muffling zone of the retort at an appropriate muffling temperature for the necessary period of time to secure the desired degree of strength, color, brightness and the like. It will be seen also that the muffling of the lithopone carried out in accordance with this invention is a substantially continuous process.

Having thus described the improved process, together with suitable means or apparatus for carrying the same into effect, what we claim and desire to secure by Letters Patent is,—

1. A retort for muffle furnaces comprising suspended vertically disposed inner and outer walls forming an intervening annular material receiving and feeding space.

2. The improvement in the manufacture of lithopone, which comprises calcining while vibrating in annular form.

3. In a vertically disposed open ended retort for muffle furnaces, a suspended relatively movable core member spaced from the walls of said retort forming an annular material carrying and feeding chamber.

4. The improvement in the manufacture of lithopone, which comprises feeding calcining and agitating the lithopone in annular form.

5. In a vertically disposed tubular retort for muffle furnaces, a core member suspended in and spaced from the walls of said retort forming an annular material receiving and feeding chamber.

6. In a muffle furnace, an open ended tubular retort, and a central vibratory element suspended therein and extending therethrough and conjointly therewith forming an annular material receiving and feeding space.

7. A retort for muffle furnaces, comprising spaced vertically disposed walls forming an annular heat transmitting and material feeding passage, said walls being sealed at the lower end and open at the upper end.

8. In a muffle furnace, a tubular retort of great heat conductivity open at its upper end and provided with a relatively movable core suspended therein from the upper end thereof and conjointly therewith forming an annular material receiving and feeding space.

9. In a muffle furnace, a furnace structure including an annular flue for the passage of the products of combustion, and tubular elements extending centrally therein forming an annular material feeding passage open at its upper end and sealed at its lower end.

10. A retort for muffle furnaces, comprising a plurality of vertically disposed walls spaced apart forming an annular heat transmitting and material feeding passage therein, said annular material feeding passage being sealed at its lower end and open at its upper end.

11. In a muffle furnace including a heat equalizing chamber and a communicating furnace flue, a vertically disposed retort having walls spaced apart forming an annular material carrying and treating chamber, and means for mechanically feeding the material in said chamber.

12. In a muffle furnace, a furnace structure including a vertically disposed flue, a tubular retort therein and spaced from the walls thereof, and a vibratory core suspended in said retort and spaced therefrom conjointly therewith forming an annular material conveying and feeding chamber.

13. An apparatus for muffling lithopone, comprising a vertically disposed externally heated retort, a discharging device at the lower end of said retort, a quenching liquid to receive the material as discharged by said discharging device, and means for sealing the material as discharged from said retort.

14. In a muffle furnace including a flue for the passage of the products of combustion, tubular elements extending centrally therein forming an annular material feeding passage open at its upper end and sealed at its lower end, and centrally located vibratory means for agitating and feeding the material in said passage.

15. In a muffle furnace including combustion chambers, and a heat equalizing manifold surmounted by a furnace heating chamber, a vertically disposed open ended retort having walls of relatively great heat conductivity spaced apart forming an annular material carrying and treating chamber, and extending in said furnace heating chamber.

16. In a muffle furnace, a vertically disposed retort having walls of relatively great heat conductivity and provided with a central core portion conjointly therewith forming an annular material receiving and feeding chamber said retort being sealed at its lower end and open at its upper end for the passage of the gases driven off from the material in said annular feeding chamber.

17. In the art of making lithopone, the improvement which comprises passing the lithopone by gravity and agitation in a relatively thin walled column through a vertically disposed tubular retort open at its top and sealed at its bottom, said retort including a central vibratory feeding element within said column of lithopone progressively feeding the same through said retort.

18. In a muffle furnace including a battery of fire boxes and a common vertical furnace chamber for the products of combustion, a vertical retort in said furnace chamber, a vibratory material-feeding element in said retort, means for feeding the material to the upper end of said retort, and means for quenching the material as discharged from the lower end of said retort.

19. In a muffle furnace including a flue for the products of combustion, a tubular retort in said flue, a central vibratory element in said retort and conjointly with the latter forming an annular material carrying and feeding chamber, means for removing the material from the lower end of said retort, and means for sealing from the air and quenching the material as discharged therefrom.

20. In a muffle furnace, a furnace structure including fire boxes and a heat equalizing manifold terminating in a common heating chamber, a tubular retort suspended therein and spaced from the walls thereof, a core movably suspended in said retort and spaced therefrom conjointly therewith forming an annular material conveying and feeding chamber, and means for vibrating said core.

21. An apparatus for muffling lithopone, comprising a vertically disposed retort, a flue for heating gases surrounding the said retort, combustion chambers for generating hot gases, a heat equalizing manifold between said chambers and said flue, and means for controlling the flow of hot gases from said combustion chambers through said heat equalizing manifold and upwardly through said flue for uniformly heating said retort.

22. An apparatus for muffling lithopone, comprising a vertical furnace column provided with a flue, a furnace structure including combustion chambers communicating with said flue and a heat equalizing chamber, a tubular retort in said flue spaced from the walls of said column, means for controlling the charge of products of combustion from said flue, and means for controlling the passage of the products of combustion from said combustion chamber to said equalizing chamber.

23. A muffle furnace for treating lithopone, comprising a furnace structure including a plurality of fire box units terminating in heat accumulating chambers and a heat equalizing manifold connecting the latter, said furnace structure also including a vertically extending flue communicating with said heat equalizing manifold, a vertically disposed retort carried by said furnace structure within said flue, and means for controlling the flow of hot gases through said flue and over said manifold.

24. In a muffle furnace, a plurality of fire box units including a common vertically disposed flue for the products of combustion, a tubular retort arranged in and spaced from the walls of said flue forming an annular heat receiving space therein, a vertically disposed core spaced from the walls of said retort and conjointly therewith forming an annular material carrying and feeding space, means for controlling the egress of the products of combustion from said flue, and means for controlling the inlet air to said furnace units.

25. A muffle furnace, comprising a plurality of heating units including vertically disposed heat equalizing chambers terminating in a common horizontal heat equalizing manifold and a furnace structure having a common heating chamber, a retort in the latter spaced from the walls of said column forming an annular retort heating chamber, a vibratory element in said retort and spaced from the walls thereof forming an annular material carrying and feeding chamber, and means for controlling the draught of the products of combustion through said furnace heating chamber.

26. In a muffle furnace, a plurality of equally spaced fire box units including a furnace structure having a common vertical heat chamber for the products of combustion, a tubular retort arranged in said heat chamber and spaced from the walls of said flue forming an annular surrounding heat receiving space, a vertical core spaced from the walls of said tubular retort and conjointly therewith forming an annular material carrying and feeding chamber, means for controlling the egress of heat from said heat chamber, and means for controlling the inlet of air to said fire box units.

27. A muffle furnace, comprising a plurality of fire box units including heat equalizing chambers terminating in a common manifold and a vertically disposed furnace column, a retort extending through the latter and spaced from the walls thereof forming an annular heating chamber therein, a core extending through said retort spaced from the walls thereof forming an annular material carrying and feeding chamber, means for controlling the draught through said annular heating chamber, and means for controlling the supply of the products of combustion from said fire box units.

28. An apparatus for muffling lithopone comprising a vertically disposed tubular retort including an annular material receiving and feeding chamber, a furnace structure having a flue for heating gases surrounding said retort, stacks operatively associated with said flue for carrying away the exhaust heating gases, means associated with each of said stacks for independently controlling the draught thereof, a battery of fire box units each provided with a heat equalizing chamber provided with a plurality of vertical passages formed by heat refractory material terminating in a horizontal heat equalizing manifold communicating with said flue.

29. An apparatus for muffling lithopone, comprising a vertically disposed externally heated retort including a vibratory core member and an annular material receiving and feeding chamber, a furnace structure including a flue for heating gases surrounding said retort, a plurality of equally spaced combustion chambers for generating hot gases including vertical heat accumulating chambers provided with a plurality of passages of relatively large surface area, said vertical heat accumulating chambers terminating in a common horizontal heat equalizing manifold, means for individually and independently controlling the flow of hot gases from said combustion chamber through said heat equalizing manifold and upwardly through said flue for uniformly heating said retort, means connected with said furnace flue for carrying away the exhaust heating gases, and means for controlling the passage of the exhaust heating gases therefrom.

In testimony whereof we have affixed our signatures.

WILLIAM R. MACKLIND.
GEORGE C. McCARTEN.
W. SYDNEY STEVENS.
EDWARD C. HOLTON.
HENRY J. HAIN.